Patented June 2, 1953

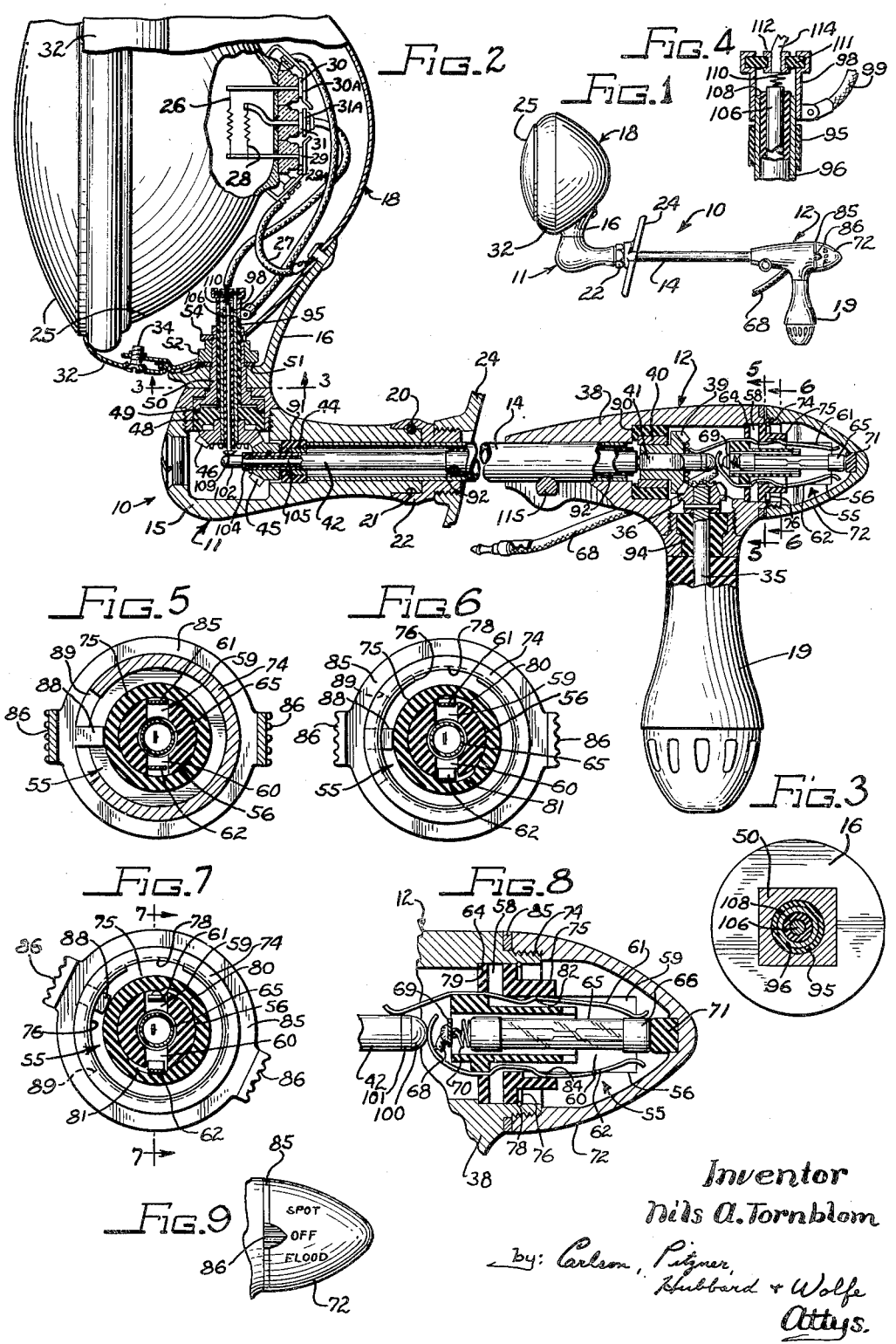

2,640,912

UNITED STATES PATENT OFFICE 2,640,912

DOUBLE BEAM AUTOMOTIVE SPOTLIGHT

Nils A. Tornblom, Chicago, Ill., assignor to Appleton Electric Company, Chicago, Ill., a corporation of Illinois Application July 8, 1949, Serial No. 103,706

4 Claims. (Cl. 240—61.13)

The present invention relates generally to accessories for use on automotive vehicles and more specifically to a novel double beam spotlight having particular utility in applications of this nature.

Occasions frequently arise when an automobile owner requires a close, adjustable, source of steady light powered from the automobile storage battery but diffused to a much greater extent than the beam of a conventional automobile spotlight. Situations such as changing a tire at night, temporarily illuminating the scene of a highway accident, performing emergency repairs on the engine, along with a host of other examples, could be cited as illustrative of the need for an appropriate light source. The problem has been met heretofore through the use of flares, hand flashlights, and various kinds of extension lamps powered directly from the automobile battery. The first two arrangements are highly inconvenient. Devices of the kind last mentioned are somewhat more satisfactory but represent a needless duplication of lighting facilities when a car is already equipped with a conventional spotlight.

One object of the present invention is to provide a novel and improved automobile spotlight which will be capable of producing selectively either a spot or a flood type beam.

Another object is to provide a spotlight of the foregoing character which will be of simple and relatively inexpensive construction.

A further object is to provide a spotlight of the type set forth which will have a novel and inexpensive selector switch possessing long life and great reliability.

Another object is to provide a spotlight of the above type which will include a self-contained but easily accessible protective fuse.

Other objects and advantages will become apparent as the following detailed description proceeds, taken in connection with the accompanying drawings, wherein:

Figure 2 is a side elevation of an illustrative spotlight embodying the present invention.

Fig. 2 is an enlarged, broken vertical sectional view taken longitudinally through the spotlight of Fig. 1 and along the medial plane of the latter.

Fig. 3 is an enlarged horizontal sectional view through the spotlight of Fig. 2 and taken in the plane of the line 3—3.

Fig. 4 is an enlarged fragmentary sectional view detailing certain of the electrical connections located within the lamp housing.

Fig. 5 is an enlarged transverse sectional view through the spotlight shown in Fig. 2 and taken in the plane of the line 5—5.

Figs. 6 and 7 are enlarged transverse sectional views through the spotlight of Fig. 2, such views being taken in the plane of the line 6—6 but with the end cap removed so as to show internal details more clearly.

Fig. 8 is an enlarged longitudinal sectional view detailing the selector switch of the spotlight shown in Fig. 2.

Fig. 9 is a fragmentary elevation showing one end of the switch head with the switch positions indicated thereon.

While the invention is susceptible of various modifications and alternative constructions, a preferred embodiment has been shown in the drawings and will be described below in considerable detail. It should be understood, however, that there is no intention to limit the invention to the specific form disclosed, but on the contrary, the intention is to cover all modifications and alternative constructions falling within the spirit and scope of the invention as expressed in the appended claims.

Referring more specifically to the drawing, there is shown in Fig. 1 and illustrative spotlight 10 embodying the present invention and comprising a lamp head 11 and a switch head 12, both rigidly fixed to opposite ends of a supporting tube 14 and defining therewith a frame for the spotlight. The lamp head 11 comprises a hollow fitting 15 which serves as a swivel support for base 16 of lamp housing 18, the base and housing being adapted to swivel together about an axis substantially perpendicular to the longitudinal axis of the tube 14. Rotation of the lamp housing 18 and its base about such perpendicular axis may readily be effected by means of a handle 19 journaled within the switch head 12 and rotatable about an axis also substantially perpendicular to the longitudinal axis of the tube 14. Swivelly fixed to one end of the fitting 15, as by means of pin and groove 20, 21, is a nut 22 which threadedly engages a mounting pad 24. This structure permits the spotlight 10 to be secured upon the body of a motor vehicle with the lamp housing outside the latter. Such arrangement also permits bodily swiveling of the entire spotlight about the longitudinal axis of the supporting tube 14 in response to the exertion of an appropriate force on the handle 19. Accidental swiveling of the spotlight about this axis is precluded by the use of a friction element (not shown) between the mounting pad 24 and the supporting tube 14.

The lamp housing 18 in the present instance is fashioned as a dished sheet metal member having the general shape of a hyperboloid. It is designed preferably to accommodate a lamp 25 of the pre-focused type and which is frequently referred to in the trade as a sealed beam lamp. By this is meant a lamp having a sealed envelope which serves as a combined reflector and lens. As the drawing indicates, the lamp 25 is provided with two separate filaments 26, 28, the former being adapted when energized to produce a spot type beam and the latter being adapted to produce a widely diverging or flood type beam. The filaments 26, 28 are connected at one end to a common terminal 29 which registers with a corresponding terminal 29A mounted in the housing 18 and grounded thereto by lead 27. At its end remote from the common terminal 29, the filament 26 connects with a terminal 30 which registers with a corresponding terminal 30A in the lamp housing. By the same token, the opposite end of the filament 28 connects with a terminal 31 disposed in registry with a corresponding terminal 31A mounted in the housing 18. While the lamp 25 may be detachably secured within the housing 18 in any suitable manner, it is retained in the present instance by the use of an annular clamping band 32, the latter in turn being secured to the housing 18 as by means of one or more screws 34.

Adjusting torque is transmitted in a somewhat conventional manner from the handle 19 to the housing 18 for effecting swivel movement of the latter about an axis perpendicular to the supporting tube 14. This is accomplished by the use of a driving stem 35 integral with the handle 19 and having fixed on its inner end a bevel gear 36 housed within hollow fitting 38 of the switch head 12. Also housed within the fitting 38 and disposed in meshing engagement with the gear 36 is another bevel gear 39. The latter is journaled in bearing 40 and is formed with a central opening of square cross section. Such opening drivingly receives squared portion 41 of a drive shaft 42 which runs longitudinally of the supporting tube 14. The end portion of the drive shaft 42 remote from the gear 39 is journaled in bearing 44 located within the fitting 15 of the lamp head. Rigidly fixed on this end of the shaft 42 is a bevel gear 45 which meshes with another bevel gear 46 drivingly connected to the lamp housing in any suitable manner. In the present instance, the gear 46 is formed with a squared hub which telescopes into a corresponding recess in bushing 48. The upper face of the latter is suitably recessed to engage diametrically opposed lugs 49 of a stepped sleeve member 50 which projects into the base 16. The sleeve member has a squared medial portion (Fig. 3) which engages a complementary socket in the base 16. To produce adequate friction between the base 16 and the fitting 15 so as to prevent spontaneous swiveling of the lamp housing, a resilient friction washer 51 is interposed between the inner face of the base 16 and a bushing 52 surrounding the sleeve member 50. A horseshoe collar 54 maintains the bushing 52 in place and thereby secures the lamp housing 18 to the lamp head fitting 15.

Provision is made in the spotlight 10 for energizing either the spot or the flood filament of the lamp 25 by means of a selector switch 55 housed within the switch head (Figs. 2 and 3). Basically, the switch 55 is of the single pole double throw type. It is built upon a barrel member 56 of suitable insulating material having an integral supporting flange 58 intermediate its ends. Located on the barrel 56 within diametrically opposed, axially extending slots 59, 60 are a pair of movable contact members 61, 62. The latter are preferably fashioned from low resistance leaf spring material such as Phosphor bronze and are slightly narrower than their respective slots so as to be free to deflect radially therein. Since the slots 59, 60 extend into the mounting flange 58 and the normal bias of the members 61, 62 causes them to flex radially outward, the inner or left hand end of the barrel is provided with a snugly fitted insulated retaining washer 64 overlying the members 61, 62.

The switch 55 includes a self-contained protective feature in the form of a relatively small cartridge type fuse 65 of the kind commonly used in automobile electrical systems (Figs. 2 and 3). The fuse 65 is housed within the longitudinal bore of the barrel 56. In the practice of the invention, full advantage is taken of the presence of the fuse in the construction of the switch, the outermost or right hand metal end cap 66 of the fuse being utilized as the stationary central contact of the selector switch. Power is supplied to this central contact from external supply lead 68, one end of which is connected to the ungrounded side of the automobile electrical system. The other end of the lead 68 connects with metal strap 69 fixed to the inner end of the barrel and isolated from the contact members 61, 62. The strap 69 has fixed thereto a small conductive coil spring 70 housed within the bore of the barrel and adapted to yieldingly abut the innermost end of the fuse 65. The latter is securely held in place by resilient pad 71 which exerts an axial thrust on the fuse in opposition to that of the spring 70. The pad 71 is carried by an access cap 72 of parabolic cross section and which is threadedly secured to boss 74 of switch head fitting 38.

For the purpose of flexing of the contact members 61, 62 selectively into engagement with the fixed contact 66, the switch barrel has mounted thereon a flanged operating collar 75 of insulating material. The latter is maintained in place by means of a snap ring 76 which engages an annular groove 78 on the inside of the boss 74. The ring and groove 76, 78 incidentally hold the switch 55 in place within the switch head fitting 38, the washer 64 abutting snugly against a small annular shoulder 79 within such fitting. The inner peripheral surface of the collar 75 is fashioned with a pair of grooves 80, 81 which are spaced circumferentially so that their axes intersect at an angle somewhat less than 180°. To cooperate with the grooves 80, 81, each of the flexible contact members is formed with a cam-like embossment 82, 84. The parts are so proportioned that the collar will have a neutral or off position (Figs. 2, 5 and 6) wherein the embossments 82, 84 both project into their associated grooves 80, 81. Under these conditions, the members 61, 62 are both flexed radially outward due to their inherent bias and neither touches the fixed contact 66. In the event that the operating collar should be rotated through a small angle in one direction, for example, clockwise as indicated in Fig. 7, the embossment 82 will be cammed out of its groove 80 and the inner peripheral surface of the collar will ride over it, resulting in flexing of the movable contact member 61 into engagement with the fixed contact 66. If such angular movement be limited to the circumferential length of the opposite slot 81, the contact member 62 will remain out of engagement in its open circuit position. By the same token, should the collar be rotated from the neutral position of Figs. 5 and 6 through a similar angle but in the counterclockwise direction, the contact 61 will remain in open circuit position while the contact 62 will be flexed inwardly to its closed circuit position against the contact 66.

In order to provide a ready means for turning the collar 75, there is mounted on the boss 74 a switch actuating ring 85 having one or more positioning lugs 86. The ring 85 has an inwardly projecting tongue 88 which registers with a notch in the flange of the operating collar 75. To provide clearance for the tongue 88, the boss 74 has a segmental slot 89, the ends of the latter serving as positive mechanical stops for the ring and collar 85, 75.

Provision is made in the spotlight 10 for making individual electrical connections between the ungrounded ends of the lamp filaments 26, 28 and the flexible contact members 61, 62 of the selector switch 55, thereby rendering each filament selectively energizable. This is accomplished by utilizing certain ones of the torque transmitting members to define the major portion of one of the circuits, in the present instance the spot filament circuit, and by running a second and independent circuit for the flood filament axially of the torque transmitting members. Turning once more to Figs. 2 and 8, it will be perceived that the innermost end of flexible contact member 61 bears against the peripheral surface of one end portion of the drive shaft 42. The latter, together with its associated bevel gears 39, 45, is electrically isolated from the frame of the spotlight 10 by means of insulating bushings 90, 91 and insulating sleeve 92. To preclude grounding of the switch head end of the shaft 42 through the gear 36 and driving stem 35, the latter is surrounded by an insulating bushing 94. Grounding of the left hand or lamp head end of the drive shaft through the gear 46 is precluded by making the bushing 48 of insulating material and also by inserting an insulating tube 95 into the sleeve member 50. To complete the electrical circuit between the gear 46 and the spot filament 26, the former has fixed therein an axially extending conductive sleeve 96 which telescopes within the insulating tube 95. Electrically connected to the upper end of the sleeve 96 is a generally cylindrical terminal member 98. A relatively short jumper lead 99 connects the terminal 98 with spot filament terminal 30A in the lamp housing.

Turning now to the flood filament circuit, it will be perceived that the innermost end of flexible contact member 62 abuts against a contact button 100 on the end of the drive shaft 42 but insulated therefrom by means of a non-conductive washer 101. The opposite end of the shaft 42 is similarly provided with a contact button 102 somewhat longer than the button 100 and which is insulated from the shaft by means of non-conductive washer 104. To permit an electrical connection to be made between the buttons 100, 102, the shaft 42 is of tubular construction and an insulated wire 105 is run axially thereof and soldered to the contact buttons at either end. The circuit between the contact button 102 and the flood filament 28 is further defined by a conductor pin 106 mounted within the sleeve 96 but electrically isolated therefrom by means of an insulating tube 108. In the present instance, the pin 106 is provided with a convex head 109 which is yieldably urged into contact with the button 102 by means of a conductive compression spring 110. The latter is held in place by an insulating washer 111 carried by the terminal 98, the spring 110 making contact with a metallic bushing 112. Soldered or otherwise secured to this bushing is a jumper lead 114 which connects with flood filament terminal 31A in the lamp housing. This arrangement permits rotation of either the button 102, the pin 106, or both, as an incident to adjustment of the spotlight without interruption of the flood filament circuit.

In view of the foregoing, it will be appreciated by those skilled in the art that either lamp filament of the spotlight 10 may be energized selectively simply by flicking the switch 55 into its spot or into its flood position. Moreover, the switch can be actuated by the thumb of the operator as an incident to adjustment of the spotlight through the use of the handle 19. Such actuation can be accomplished entirely by touch without requiring the driver of the automobile to focus his eyes directly upon the switch operating lug 86. In addition, a shift can be made from one beam to the other regardless of the position in which the spotlight may be adjusted.

The spotlight 10 may be installed without difficulty simply by loosening clamping bolt 115 and withdrawing the drive shaft 42 and supporting tube from the switch head 12. This can be done without dislocating the gear 39 which is held in position by the gear 36 and the bearing 40. After removal of the switch head, the end of the drive shaft and supporting tube may be inserted through the mounting hole in the vehicle body and the mounting pad subsequently bolted in place. The switch head may then be remounted upon the supporting tube and secured by means of bolt 115.

The arrangement of electrical parts utilized in the spotlight 10 possesses a number of other advantages in addition to those already set forth herein. Notwithstanding its simplicity and low cost, the sliding contact arrangement is exceptionally rugged and is substantially unaffected by vibration incident to use in a motor vehicle. Furthermore, the electrical system of the automobile is effectively protected in the event of damage to the spotlight by means of the self-contained but readily accessible fuse 65. Moreover, the novel combination and arrangement of parts in the selector switch 55 eliminates the need for screws and other conventional fastening devices, at the same time endowing the switch with reliability and long life.

I claim as my invention:

1. A spotlight of the character set forth comprising, in combination, a supporting tube, a lamp head fitting fixed to one end of said supporting tube, a lamp housing mounted on said lamp head fitting for swivel movement about an axis perpendicular to said supporting tube, a prefocused lamp having a spot filament and a flood filament, said lamp also having an integral lens and reflector, terminals within said lamp housing, means for detachably securing said lamp in said housing in registry with said terminals, a switch head fitting fixed to the opposite end of said supporting tube, an adjusting handle journaled in said switch head fitting and insulated therefrom, a hollow drive shaft insulated from the supporting tube of said spotlight, a first driving means connecting said handle and said drive shaft, a second driving means connecting said lamp housing and said drive shaft, electrical connections between said second driving means and one of said lamp filaments, an axial conductor housed within said drive shaft but insulated therefrom, a headed conducting pin housed within said second driving means but insulated therefrom, means connecting said conducting pin with the other of said lamp filaments, and switch means for energizing either of said lamp filaments selectively via the alternative paths of which said drive shaft and said axial conductor respectively comprise integral links.

2. A double beam spotlight for motor vehicles and the like comprising, in combination, a frame including a supporting tube, a lamp housing mounted adjacent one end of said supporting tube for swivel movement about an axis substantially perpendicular to the latter, a lamp within said housing having a pair of filaments, a switch head having an adjusting handle journaled therein, torque transmitting members interposed between said handle and said lamp housing, said members being electrically insulated from the frame of said spotlight, and electrical connecting members concentric with certain ones of said torque transmitting members but insulated therefrom, a switch mounted in said switch head and having terminals in contact respectively with said torque transmitting members and said electrical connecting members, said switch being adapted to effect the energizing of said lamp filaments selectively via the alternative paths presented by said torque transmitting members and said electrical connecting members.

3. A spotlight for motor vehicles and the like comprising, in combination, a frame including a supporting tube, a lamp housing mounted adjacent one end of said supporting tube for swivel movement about an axis substantially perpendicular to the latter, said lamp housing being adapted to receive a prefocused lamp having a spot filament and a flood filament, a common lamp terminal grounded to said lamp housing, a pair of insulated terminals in said lamp housing and adapted to register respectively with the spot and flood filament terminals of the lamp, a switch head having an adjusting handle thereon, torque transmitting members interposed between said handle and said lamp housing, said members being electrically insulated from the frame of said spotlight, and electrical connecting members concentric with said torque transmitting members but insulated therefrom, a selector switch mounted in said switch head having terminals connected respectively to said torque transmitting members and to said electrical connecting members, said switch being adapted to effect the energizing of said lamp filaments selectively via the alternative paths presented by said torque transmitting members and said electrical connecting members.

4. A double beam spotlight for motor vehicles and the like comprising, in combination, a frame including a supporting tube, a lamp housing mounted adjacent one end of said supporting tube for swivel movement about an axis substantially perpendicular to the latter, said housing being adapted to receive a lamp having a pair of filaments, a switch head having an adjusting handle journaled therein, torque transmitting members interposed between said handle and said lamp housing, said members being electrically insulated from the frame of said spotlight, and electrical connecting members concentric with certain ones of said torque transmitting members but insulated therefrom, a non-conductive barrel mounted in said switch head and having a fixed contact at one end thereof, resilient movable contact members on said barrel and each having one end in proximity to said fixed contact, the opposite ends of said resilient contact members being disposed respectively in contact with said torque transmitting members and said electrical connecting members, and cam means for selectively flexing said movable contact members into engagement with said fixed contact to effect closure of the circuit between the latter and the selected one of said movable contact members.

NILS A. TORNBLOM.

References Cited in the file of this patent

UNITED STATES PATENTS

| Number | Name | Date |
|---|---|---|
| 1,592,878 | Wittington | July 20, 1926 |
| 1,794,133 | Anderson | Feb. 24, 1931 |
| 1,921,784 | Sklarek | Aug. 8, 1933 |
| 1,921,785 | Sklarek | Aug. 8, 1933 |
| 1,981,204 | Sklarek | Nov. 20, 1934 |
| 2,191,049 | Tornblom | Feb. 20, 1940 |
| 2,245,793 | Kurlander | June 17, 1941 |